(12) United States Patent
Srinivasan et al.

(10) Patent No.: US 9,560,613 B1
(45) Date of Patent: Jan. 31, 2017

(54) VALIDATING SYNCHRONIZATION COMPLIANCE USING NETWORK MEASUREMENTS

(71) Applicant: Google Inc., Mountain View, CA (US)

(72) Inventors: Murari Srinivasan, Palo Alto, CA (US); Mitch Trott, San Mateo, CA (US)

(73) Assignee: Google Inc., Mountain View, CA (US)

( * ) Notice: Subject to any disclaimer, the term of this patent is extended or adjusted under 35 U.S.C. 154(b) by 515 days.

(21) Appl. No.: 13/870,264

(22) Filed: Apr. 25, 2013

(51) Int. Cl.
*H04L 12/26* (2006.01)
*H04W 56/00* (2009.01)

(52) U.S. Cl.
CPC .................................. *H04W 56/001* (2013.01)

(58) Field of Classification Search
CPC ....... H04W 24/08; H04W 24/10; H04W 48/02
See application file for complete search history.

(56) References Cited

U.S. PATENT DOCUMENTS

| | | | | |
|---|---|---|---|---|
| 8,948,038 B1 * | 2/2015 | Trott | ................... | H04W 52/243 370/252 |
| 2001/0005177 A1 * | 6/2001 | Norimatsu | ..................... | 342/387 |
| 2004/0092232 A1 * | 5/2004 | Zeira | ..................... | H04W 16/14 455/67.11 |
| 2006/0141939 A1 * | 6/2006 | Nakada | ........................... | 455/69 |
| 2011/0158164 A1 * | 6/2011 | Palanki | ......................... | 370/328 |
| 2011/0275385 A1 | 11/2011 | Escolar-Piedras et al. | | |
| 2012/0008524 A1 * | 1/2012 | Amirijoo | .............. | H04W 24/10 370/252 |
| 2012/0094660 A1 * | 4/2012 | Radulescu | ............ | H04W 24/10 455/434 |
| 2012/0252471 A1 * | 10/2012 | Futaki | ........................... | 455/450 |
| 2012/0264439 A1 * | 10/2012 | Jorguseski et al. | ........... | 455/446 |
| 2013/0017841 A1 | 1/2013 | Kazmi et al. | | |

FOREIGN PATENT DOCUMENTS

| | | |
|---|---|---|
| EP | 2513662 A2 | 10/2012 |
| EP | 2537043 A1 | 12/2012 |
| WO | WO-2011100859 A1 | 8/2011 |
| WO | WO-2011142715 A1 | 11/2011 |
| WO | WO-2012047144 A1 | 4/2012 |
| WO | WO-2012177205 A1 | 12/2012 |

OTHER PUBLICATIONS

Ebner, A., et. al., Synchronization in Ad Hoc Networks Based on Utra TDD, Munchen, Germany, 2002, 5pp., all pages.

* cited by examiner

*Primary Examiner* — Kevin C Harper
(74) *Attorney, Agent, or Firm* — Honigman Miller Schwartz and Cohn LLP

(57) ABSTRACT

A method of synchronization validation in a wireless network. The method includes receiving, at a computing processor, a network measurement from at least one wireless terminal in the wireless network. The network measurement is made with respect to at least one base station in the wireless network. The method also includes determining, at the computing processor, a synchronization state of at least one base station based on the received network measurement.

30 Claims, 3 Drawing Sheets

VALIDATING SYNCHRONIZATION COMPLIANCE USING NETWORK MEASUREMENTS

TECHNICAL FIELD

This disclosure relates to augmenting spectrum sharing using network measurements.

BACKGROUND

Wireless communications continue to gain in popularity, but wireless communications are constrained due to a lack of available, interference free spectrum that may be used for reliable communications within a geographic area. Moreover, wireless systems often have power, frequency and timing regulations or constraints. Power restrictions are often imposed by regulatory authorities. Unlicensed WiFi devices, for example, are governed by FCC PARIS 5 restrictions on power that limit the devices to a few hundred mW indoors. Frequency accuracy requirements are often driven by standards organizations, vendors and operators to ensure good interoperability between network infrastructure and user devices. Cellular systems, which operate at higher power in licensed spectrum, have stringent requirements for frequency accuracy of transmitters, typically under 100 parts per billion.

Most cellular systems deployed today operate in a frequency-division duplex (FDD) configuration where the transmitter and receiver operate at different carrier frequencies. A forward communication link from base stations to wireless terminals is carried on a different frequency from a reverse link from the wireless terminals to the base stations. That means for every band that a phone supports, it actually uses two frequency ranges, which are known as paired frequency bands. FDD communications require very little coordination between base stations, but do require that paired spectrum be available.

Wireless communication in time-division duplex (TDD) configuration is also feasible. TDD uses one single range of frequencies in a frequency band, but that band is segmented to support transmit and receive signals in a single frequency range. Specifically, TDD applies time-division multiplexing to separate outward and return signals. The forward and reverse links simply alternate in time. One of the advantages of TDD communication is that paired spectrum is not required and two-way communication can be achieved in a single slice of spectrum. While only a very small number of TDD networks are operational in the world today, the utility and value of TDD spectrum is growing rapidly across the world due to the exhaustion of easily pairable bands to support FDD operation.

SUMMARY

One aspect of the disclosure provides a method of synchronization validation in a wireless network. The method includes receiving, at a computing processor, a network measurement from at least one wireless terminal in the wireless network. The network measurement is made with respect to at least one base station in the wireless network. The method also includes determining, at the computing processor, a synchronization state of at least one base station based on the received network measurement.

Implementations of the disclosure may include one or more of the following features. In some implementations, the method includes instructing the wireless terminal(s) to take network measurements at certain time intervals and providing the wireless terminal(s) a time reference. The method may include instructing cessation of transmission of a base station having a synchronization state of unsynchronized.

The network measurement may include a timing offset measurement between a first base station and a second base station. In some implementations, the network measurement is a reference signal time difference between the first and second base stations. The method may include determining that the first and second base stations are in an unsynchronized state when the reference signal time difference between the first and second base stations is greater than a threshold time difference. The method may also include identifying a deviant base station having an unsynchronized state based on multiple network measurements received with respect to the deviant base station (e.g., multiple measurements with neighboring base stations) and instructing cessation of transmission of the deviant base station. In some examples, the network measurements are reference signal time differences with respect to multiple different base stations and the deviant base station. The method may include receiving a threshold number of network measurements before identifying the deviant base station.

In some implementations, the method includes identifying a set of wireless terminals associated with a base station and instructing the set of wireless terminals or a subset of the wireless terminals associated with the base station to return network measurements. Moreover, the method may include instructing different subsets of wireless terminals associated with the base station over time to return network measurements and/or instructing random subsets of wireless terminals associated with the base station over time to return network measurements.

The method may include instructing the wireless terminal(s) to take network measurements on a communication band at any time the wireless terminal(s) is not transmitting on that band or on a communication band during uplink time slots. Additionally or alternatively, the method may include instructing the wireless terminal(s) to take network measurements on a communication band upon realizing a trigger condition, such as a loss of communications with the wireless network. In such cases, the method may include instructing the wireless terminal(s) to store the network measurements in non-transitory memory during loss of communications with the wireless network and report the stored network measurements after regaining communications with wireless network.

Another aspect of the disclosure provides a synchronization controller for a wireless network having base stations in wireless communication with at least one wireless terminal. The synchronization controller includes a computing processor executing a set of instructions that configure the computing processor to receive a network measurement made with respect to at least one base station from the at least one wireless terminal and determine a synchronization state of at least one base station based on the received network measurement.

In some implementations, the computing processor is configured to instruct the wireless terminal(s) to take network measurements at certain time intervals and providing the wireless terminal(s) a time reference. The computing processor may be configured to instruct cessation of transmission of a base station having an unsynchronized state.

The network measurement may include a timing offset measurement between a first base station and a second base station. In some implementations, the network measurement is a reference signal time difference between the first and second base stations. The computing processor may be configured to determine that the first and second base stations are in an unsynchronized state when the reference signal time difference between the first and second base stations is greater than a threshold time difference. The computing processor may also be configured to identify a deviant base station having an unsynchronized state based on multiple network measurements received with respect to the deviant base station (e.g., multiple measurements with neighboring base stations) and instruct cessation of transmission of the deviant base station. In some examples, the network measurements are reference signal time differences with respect to multiple different base stations and the deviant base station. The computing processor may be configured to receive a threshold number of network measurements before identifying the deviant base station.

In some implementations, the computing processor is configured to identify a set of wireless terminals associated with a base station and instructing the set of wireless terminals or a subset of the wireless terminals associated with the base station to return network measurements. Moreover, the computing processor may be configured to instruct different subsets of wireless terminals associated with the base station over time to return network measurements and/or instructing random subsets of wireless terminals associated with the base station over time to return network measurements.

The computing processor may be configured to instruct the wireless terminal(s) to take network measurements on a communication band at any time the wireless terminal(s) is not transmitting on that band or on a communication band during uplink time slots. Additionally or alternatively, the computing processor may be configured to instruct the wireless terminal(s) to take network measurements on a communication band upon realizing a trigger condition, such as a loss of communications with the wireless network. In such cases, the computing processor may be configured to instruct the wireless terminal(s) to store the network measurements in non-transitory memory during loss of communications with the wireless network and report the stored network measurements after regaining communications with wireless network.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
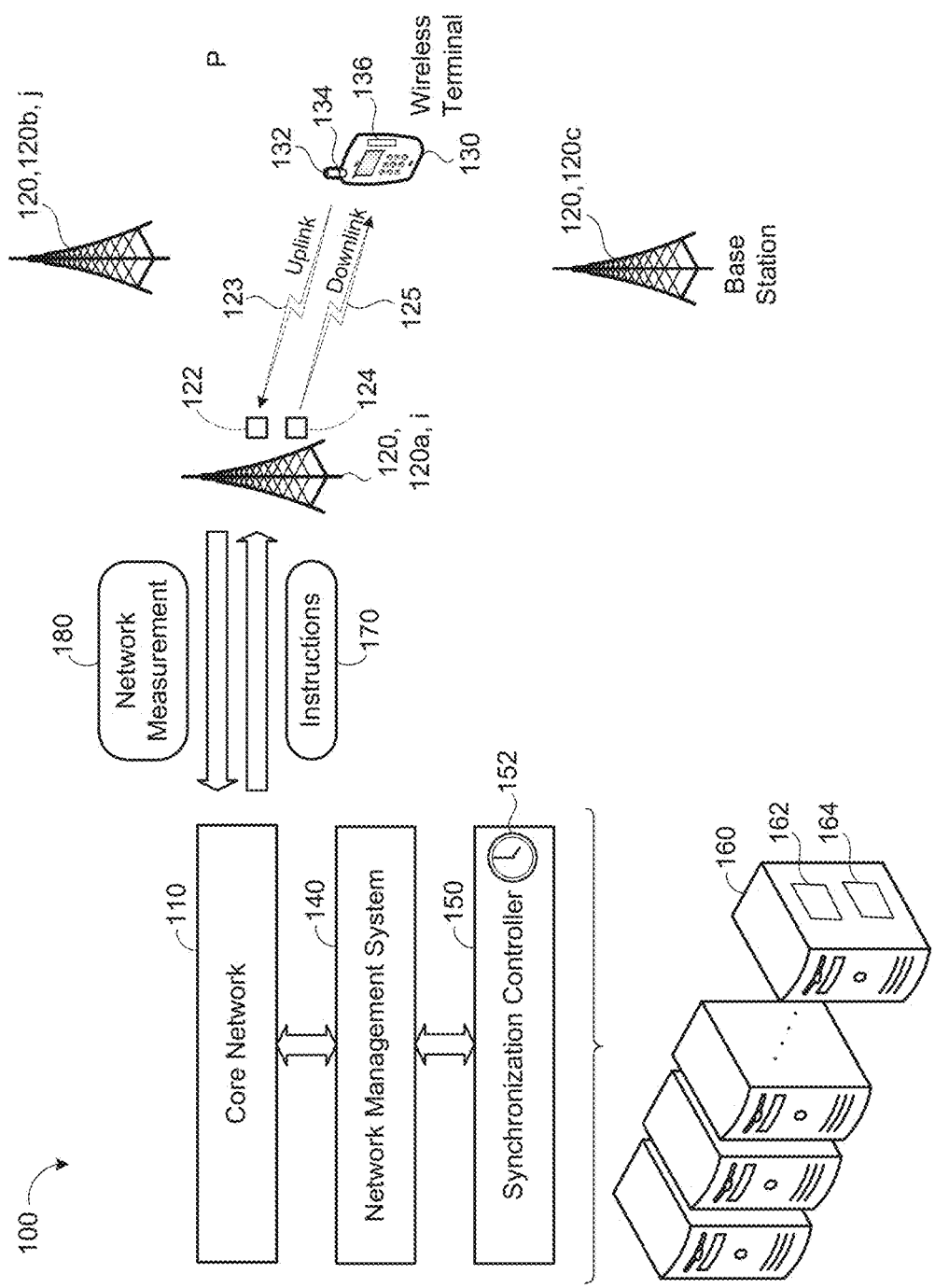
FIG. 1 is a schematic view of an exemplary wireless network.
Figure 2:
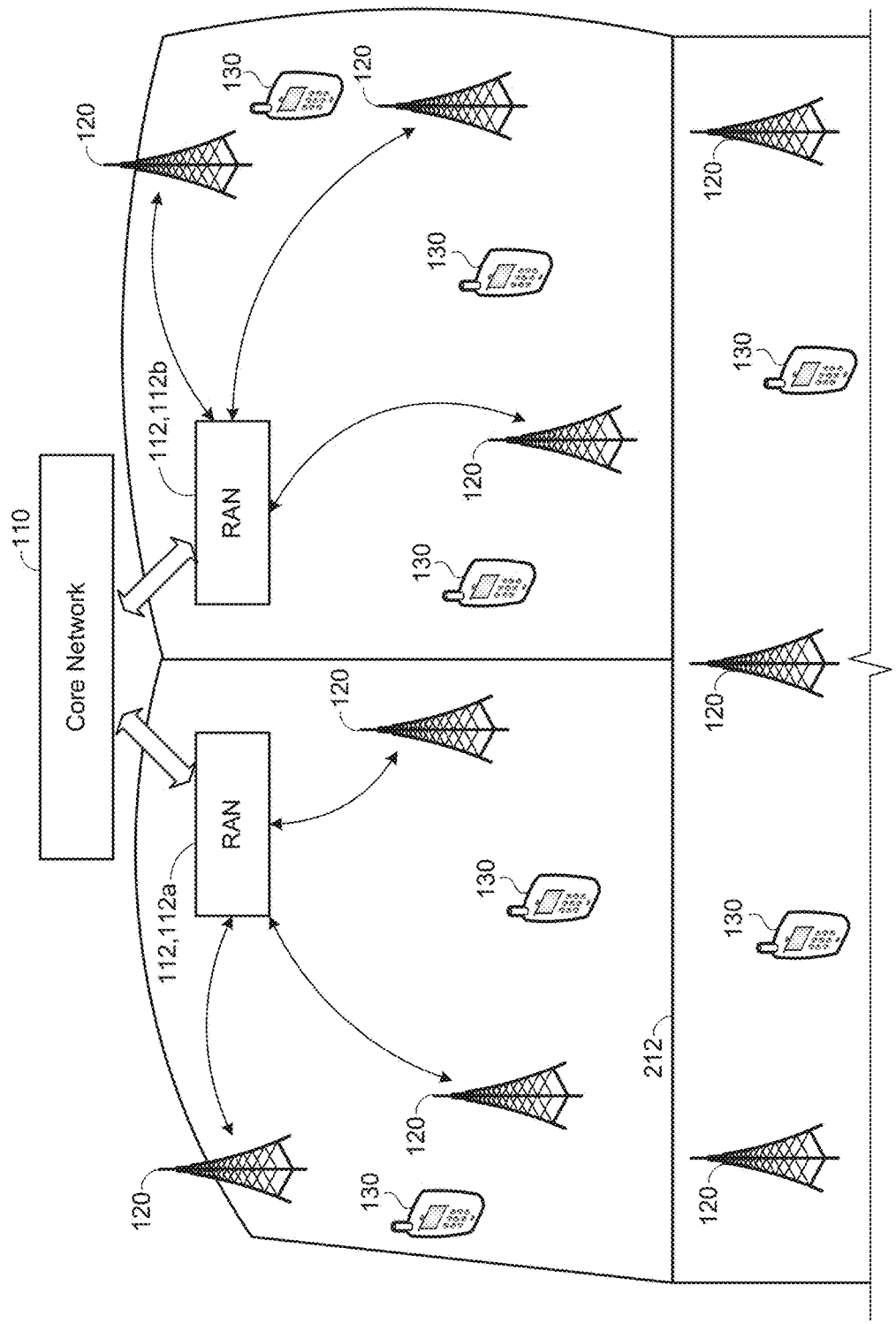
FIG. 2 is a schematic view of an exemplary wireless network.

Referring to FIG. 1, in some implementations, a wireless network 100 (e.g., a cellular radio access network) includes a core network 110 in communication with one or more base stations 120, which may be in wireless communication with one or more wireless terminals 130. A network management system 140 communicates with a synchronization controller 150 and the core network 110. The work management system 140 and the synchronization controller 150 may execute on one or more computing processors 162 of one or more computers 160. Moreover, instruction set(s) of the network management system 140 and the synchronization controller 150 may be stored in non-transitory memory 164 of the computer(s) 160.

A wireless terminal 130 may be any wireless device or node, e.g., personal digital assistant (PDA), laptop, mobile phone, sensor, fixed relay, mobile relay or even a small base station that is being positioned when timing measurements for positioning are considered. A base station 120 may be associated with a radio network node, where a radio network node includes in a general sense any node capable of transmitting and/or receiving radio signals that may be used for network measurements, such as e.g., an eNodeB, macro/micro/pico base station, home eNodeB, relay, beacon device, or repeater. The radio network node may be a single Radio Access Technology (RAT) or multi-RAT or multi-standard radio base station. Note that downlink and uplink transmissions do not need to be between the wireless terminal 130 and the same radio network node/base station 120.

The core network 110 may be the central part of a telecommunication network that provides various services to customers who are connected by an access network. The core network may route telephone calls across the public switched telephone network (PSTN). Additionally, the core network 110 may provide aggregation, authentication (e.g., deciding whether a user requesting a service is authorized), call control/switching (e.g., deciding the future course of a call based on call signal processing), charging (e.g., collation and processing of charging data generated by various network nodes), service invocation, and/or gateway functionality. The network management system (NMS) 140 is a combination of hardware and software used to monitor and administer the core network 110.

In some implementations, the synchronization controller 150 is a logical entity responsible for maintaining synchronization in the cellular radio access network 100 (wireless network). The synchronization controller 150 may include a computing processor 162 executing a set of instructions (e.g., stored in non-transitory memory 164) that configure the computing processor 162 to execute a synchronization validation routine. Synchronization is an important aspect of wireless networks. The radio uplink 123 is the transmission path from a transmitter 132 of a wireless terminal 130 to an uplink receiver 122 of a base station 120, and the radio downlink 125 is the transmission path from a downlink transmitter 124 of the base station 120 to a receiver 134 of the wireless terminal 130. In frequency-division duplex (FDD) wireless networks, frequency synchronization is a key requirement, and time synchronization is not particularly important because of the lack of uplink-downlink interference due to band separation. In time-division duplex (TDD) wireless networks, both time and frequency synchronization are key requirements, and loss of synchronization can result in extreme uplink-downlink interference, which may result in parts of the network becoming unusable. Transmitters in a TDD wireless network are time-synchronized so that they alternate between transmission and reception in a coordinated manner, or the transmitters must be separated in frequency to avoid harmful downlink-uplink mutual interference effects that are orders of magnitude higher than is encountered in FDD systems.

When an infrastructure element, such as a base station 120, falls into an unsynchronized state, the network management system 140 may force that infrastructure element to stop transmitting signals. The infrastructure element may fall into an unsynchronized state due to a number of reasons, including, but not limited to, degradation of oscillators within the element, GPS antenna malfunctions, network degradation leading to PTP failure, etc. In many of these cases, the infrastructure element may not be aware that it is losing synchronization with respect to the master timing reference 152 (e.g., a clock). Detection of these kinds of infrastructure abnormalities may be done through routine inspection, field-based sensors or other methods. However, these approaches are expensive, inefficient or impractical.

If synchronization is not ensured in the wireless network 100, downlink and uplink time slots corresponding to different base stations 120 may overlap. In this situation, an uplink receiver 122 of a first base station 120a may encounter very strong interference from downlink transmissions 125 of downlink transmitters 124 of neighboring second base station 120b-c. The downlink transmissions 125 may easily dominate mobile uplink transmissions 123 by two orders of magnitude even for relatively small-cell systems. Similarly, a wireless terminal 130 attempting to process downlink transmission 125 received from a base station 120 may get saturated by uplink transmissions 123 from transmitters 132 of other nearby wireless terminals 130 that may be transmitting to other base stations 120.

Long Term Evolution (LTE), which can be implemented as an FDD or TDD system, works on two different types of air interfaces (radio links) that include downlink 125 (from tower to device) and uplink 123 (from device to tower). For the downlink 125, LTE uses an OFDMA (orthogonal frequency division multiple access) air interface. Alternatively, a wireless network 100 may use CDMA (code division multiple access) or TDMA (time division multiple access) air interfaces. OFDMA mandates usage of MIMO (Multiple Input Multiple Output), which means that devices have multiple connections to a single cell, increasing the stability of the connection, reducing latency, and increasing a total throughput of a connection. MIMO generally works better when the carrier antenna are further apart. For example, on relatively smaller phones, the noise caused by the antennae being so close to each other may cause LTE performance to drop.

For the uplink 123, LTE uses a DFTS-OFDMA (discrete Fourier transform spread orthogonal frequency division multiple access) scheme to generate a SC-FDMA (single carrier frequency division multiple access) signal. An SC-FDMA signal is better for uplink 123 because it has a better peak-to-average power ratio over OFDMA for uplink 13. Despite the name, SC-FDMA is still a MIMO system. LTE uses a SC-FDMA 1×2 configuration, which means that for every one antenna on the transmitting device (e.g., the wireless terminal 130); there are at least two antennae on the base station 120 for receiving.

The major difference between the OFDMA signal for downlink 125 and the SC-FDMA signal for uplink 123 is that it uses a discrete Fourier transform function on the data to convert it into a form that can be used to transmit. Discrete Fourier transform functions are often used to convert digital data into analog waveforms for decoding audio and video and it can be used for outputting the proper radio frequencies too.

WiFi networks, which are typically not time-synchronized, typically address the interference problem by placing neighboring access points in different frequency channels. While this addresses the interference issue, it is highly wasteful of spectrum. TDD licensed-spectrum cellular systems generally aim to maximize spectral efficiency, and therefore generally use time-synchronization techniques to avoid downlink-uplink interference. Typically, infrastructure elements, such as base stations 120, are synchronized, and wireless terminals 130 derive this timing since they are slaved to the base stations 120. The synchronization controller 150 may provide a timing reference or clock 152 for the wireless network 100.

Verifying synchronization compliance may not be an easy task, particularly with hardware failures. For example, a packet-timestamp-based protocol such as IEEE 1588 can ensure that the synchronization controller 150 and the wireless terminal 130 are synchronized and compliant from a protocol perspective. A faulty oscillator on the wireless terminal 130, however, can still result in a loss of synchronization, even if the packet time protocol is functioning correctly, which causes stability issues in a nearby network neighborhood.

In general, seamless mobility is a primary design metric for cellular wireless systems. To facilitate mobility, mechanisms are built into cellular technologies (e.g., the wireless network 100) that allow wireless terminals 130 to make measurements 180 not just of the base stations 120 they are connected to, but of neighboring base stations 120 as well. These network measurements 180 may include, but are not limited to, signal power measurements as well as timing measurements. Typically, the core network 110 or the network management system 140 makes a determination whether a wireless terminal 130 would be better served by an alternative base station 120, based on the network measurements 180, and issues the necessary commands.

In some implementations, the synchronization controller 150 uses the network measurements 180, such as existing, standards-mandated measurements (e.g., as specified for in 3GPP UMTS and LTE technologies), from one or more wireless terminals 130 in the wireless network 100 to verify synchronization compliance. The network measurements 180 may be same or similar to the measurements used for handover purposes.

To enforce synchronization compliance, the network management system 140 or the synchronization controller 150 may send instructions 170 to one or more wireless terminals 130 to obtain network measurements 180 of the wireless network 100 (e.g., at certain time intervals or on a periodic basis). The instructions 170 may cause the wireless terminal(s) 130 to periodically report a timing offset between base stations 120 (e.g., for 3GPP LTE systems, the timing offset may be a Reference Signal Time Difference (RSTD) measurement). The synchronization controller 150 may communicate the instruction(s) 170 to the wireless terminal(s) 130 via to the network management system 140, the core network 110 and the base station(s) 120.

In some implementations, the synchronization controller 150 identifies a set of wireless terminals 130 associated with a base station 120 and instructs the set of wireless terminals 130 or a subset of the wireless terminals 130 associated with the base station 120 to return network measurements 180. Moreover, the synchronization controller 150 may instruct different subsets of wireless terminals 130 associated with the base station 120 over time to return network measurements 180 and/or instruct random subsets of wireless terminals 130 associated with the base station 120 over time to return network measurements 180.

The wireless terminal(s) 130 need not be connected to the network 100 while taking network measurements 180. The wireless terminal(s) 130 may collect information over a period of time and/or while unconnected from the network 100 and then report the collected network measurements 180 to a connected base station 120 at a later time while connected to a network 100. For example, mobile wireless terminals 130 (e.g., cell phones) may collect network measurements while moving about and while connected or disconnected from base stations 120. The wireless terminals 130 may report network measurements 180 to corresponding base stations 120, which forward the network measurements back to the core network 110, which then forwards the network measurements 180 to the network management system 140, which may forward the network measurements 180 to the synchronization controller 150.

In some implementations, the synchronization controller 150 instructs the wireless terminal(s) 130 to take network measurements 180 on a communication band upon realizing a trigger condition, such as a loss of communications with the wireless network 100. In such cases, the synchronization controller 150 may instruct the wireless terminal(s) 130 to store the network measurements 180 in non-transitory memory 136 during loss of communications with the wireless network 100 and report the stored network measurements 180 after regaining communications with wireless network 100. Additionally or alternatively, the synchronization controller 150 may instruct the wireless terminal(s) 130 to take network measurements 180 on a communication band at any time the wireless terminal(s) 130 is not transmitting on that band or on a communication band during uplink time slots.

The Universal Mobile Telecommunication System (UMTS) is one of the third generation mobile communication technologies designed to succeed GSM. 3GPP Long Term Evolution (LTE) is a project within the 3rd Generation Partnership Project (3GPP) to improve the UMTS standard to cope with future requirements in terms of improved services such as higher data rates, improved efficiency, and lowered costs. To meet Location-Based Services (LBS) demands, the LTE network may use one or more positioning methods, each of which may be UE-based, UE-assisted or network-based.

Observed Time Difference of Arrival (OTDOA) is a position method where a wireless terminal 130 measures the timing differences for downlink reference signals 125 received from multiple distinct locations, such as base stations 120 (e.g., eNodeBs). For each measured neighbor base station 120, the wireless terminal 130 measures Reference Signal Time Difference (RSTD) which is the relative timing difference between a neighbor base station 120b (neighbor cell) and the reference base station 120a (reference cell). The wireless terminal 130 may measure the timing of the received downlink reference signals 123 and the resulting measurements are used to locate the wireless terminal 130 in relation to the neighboring base stations 120 (neighboring cells).

In LTE OTDOA, the wireless terminal 130 measures Reference Signal Time Difference (RSTD) which has been defined in the standard (3GPP 36.214 "Physical Layer Measurements") as the relative timing difference $\Delta T$ between cell j and cell i, defined as:

$$\Delta T = T_{SubframeRxj} - T_{SubframeRxi} \quad (1)$$

where: $T_{SubframeRxj}$ is the time when the wireless terminal 130 receives the start of one subframe from cell j, $T_{SubframeRxi}$ is the time when the wireless terminal 130 receives the corresponding start of one subframe from cell i that is closest in time to the subframe received from cell j. The reference point for the observed subframe time difference shall be the antenna connector of the wireless terminal 130.

The RSTD measurement captures the timing offset between a first base station 120a, "i" that a wireless terminal 130 (also referred to as a UE in 3GPP) is connected to, and a neighboring, second base station 120b, "j." If the RSTD between these two base stations 120a, 120b exceeds a threshold, the synchronization controller 150 may determine that base stations 120a, 120b are mutually unsynchronized, and potentially can cause harmful interference to each other. The synchronization controller 150 may identify a deviant base station 120 by receiving a threshold number of network measurements 180 made by wireless terminals 130 connected to various base stations 120 in the network 100.

In 3GPP UMTS ("3G") systems, wireless terminals 130 may measure a SFN-SFN Observed Time Difference (OTD), as defined in 3GPP 25.215. A single-frequency network (SFN) is a broadcast network where several transmitters simultaneously send the same signal over the same frequency channel.

In some implementations, the wireless terminal(s) 130 report the network measurements 180 (e.g., RSTD or OTD) back to the base stations 120 they are connected to over the air-interface. The base stations 120 forward these measurements 180 back to the core network 110, which may forward them to the network management system 140. The network management system 140 may make a determination about synchronization, for example, based on set thresholds. Additionally or alternatively, network management system 140 may forward the network measurements 180 to the synchronization controller 150, which may assess the state of synchronization.

The synchronization controller 150 may use a variety of mechanisms to facilitate time synchronization with the timing reference or clock 152. These may include, but are not limited to: global positioning system (GPS) receivers that derive time from GPS satellites, augmented by A-GPS (assisted GPS) correction signals sent from ground base stations 120; packet-based time synchronization protocols (e.g., Network Time Protocol (NTP) and Precision Time Protocol (PTP or IEEE 1588) synchronize with remote clocks 152); and network listen, where a base station 120 may incorporate a second receiver 122 to listen to other wireless base stations 120 in the area to derive their timing reference. The synchronization requirements for TD-LTE are converging generally around metrics of 50 parts per billion (ppb) for frequency synchronization and under 3 microseconds for time synchronization.

The network management system 140 or the synchronization controller 150 may inform a mobile radio access network (RAN) 112, 112a-b (e.g., MME in a 4G LTE network, RNC in a 3G UMTS network), via the core network 110, about the need for making measurements 180 of one or more of its base stations 120. A Radio Access Network (RAN) 112 provides connection between user equipment, such as a mobile phone, a computer, or any remotely controlled machine, and its core network 110. The RAN is 112 typically enabled by and implemented in the base stations 120, while the core network 110 is typically distinct from the RAN 112. Base stations 120 within the RAN 112 are typically aware of the state of connected wireless terminals 130, specifically which wireless terminals 130 may be associated with which base station 120. The RAN 112 may communicate terminal information (e.g., mobile device identification, location, etc.) to the core network 110 for wireless terminals 130 associated with a particular base station 120. The RAN 112 may instruct a subset of these wireless terminals 130 (e.g., at the direction of the core network 110 or network management system 140) to conduct measurements 180 of the base station 120 and return these measurements back to the core network 110.

Over time, different subsets of wireless terminals 130 may be employed to conduct measurements 180 of the base station(s) 120. The network management system 140 or the synchronization controller 150 can then identify deviant base stations 120 (i.e., base stations 120 that have fallen out of synchronization) from a population of wireless terminals 130.

In some implementations, a random group of wireless terminals 130 may be instructed to conduct measurements 180 across the radio access network 112, which are then relayed to the network management system 140 or the synchronization controller 150, along with association points of these wireless terminals 130. The locations of these base stations 120 with which the wireless terminals 130 are associated can be used to produce approximate locations for the wireless terminals 130 themselves. In turn, the synchronization controller 150 can determine possible interference with other base stations 120 detected and measured by the wireless terminals 130 and reported back to the synchronization controller 150.

While wireless terminals 130 for wireless networks 100 are typically not designed to measure signals from other wireless terminals 130, in many cases their hardware and software can be adapted to do so without undue cost. This is particularly true in time-division duplex (TDD) wireless systems, in which transmission and reception occur on the same frequency band. In this case, the radio and baseband hardware is already equipped with many of the capabilities needed for measurement. For systems such as TDD LTE, which have a flexible time slot structure in which time slots may be used for transmission or reception depending on configuration messages, the modifications required may be small.

A wireless terminal 130 may take measurements on a band at any time it is not transmitting on that band. In a slotted TDD system, uplink measurements may be taken on a band during uplink (transmit) time slots in which the wireless terminal 130 does not itself transmit on that band. Due to practical limits on RF design, in many cases the hardware in the wireless terminal 130 is able to take useful measurements only when the wireless terminal 130 has no transmissions on any band, not just the band being measured.

In a wireless network 100 there may be geographic regions in which transmission on a particular band is permitted, and these regions may abut regions in which transmission in that band is forbidden. It is particularly advantageous for a mobile wireless terminal 130 to take uplink measurements 180 on a band in regions where transmission is forbidden, to assess whether undesired interference is impinging on this area. To make these measurements 180, the receiver 134 in the wireless terminal 130 may be configured to be active even though the transmit section is disabled. Further, to be best able to take measurements 180 at precise timing instants, the wireless terminal 130 may require an accurate time reference. In some locations, the timing reference 152 may be extracted from transmissions of pilot signals. In a forbidden area, however, the pilot signals may be too weak to detect, in which case the timing reference 152 may be extracted from some other wireless connection that is not forbidden, such as a cellular system operating in a different band.

A wireless terminal 130 taking uplink measurements 180 may need information about which bands to measure at what times. If the wireless terminal 130 has a communication path that allows it to receive real-time messages, the measurements 180 can be carried out on demand in response to commands from the network management system 140 or some other infrastructure. If, however, the wireless terminal 130 lacks such a communication path, or if it is desirable to use that path only infrequently, one option is to preload instructions on the wireless terminal 130 that cause it to take measurements 180 under certain trigger conditions, for example, when the device is at or near a location or region and store the network measurements in non-transitory memory 136 of the wireless terminal 130. These measurements 180 can be delivered to the network management system 140 or the synchronization controller 150 at a later time, for example after the wireless terminal 130 regains communication.

Most modern communication systems earmark airlink resources for initial access transmissions by wireless terminals 130. Typically, these resources are referred to as the "RACH" (random access channel) channel, and may have a well-known but cell-specific physical structure in the time-frequency space. The RACH is used to get the attention of a base station 120 in order to initially synchronize a transmission 123 of the wireless terminal 130 with the base station 120. Moreover, the RACH is a shared channel used by wireless access terminals 130 to access the network 100 especially for initial access and bursty data transmission. The RACH carries the advantage of being a non-coded waveform, and thus decodable by any entity that is aware of their structure. If wireless terminals 130 are made aware of these resources and the special RACH signaling waveforms employed in those cells, they can measure RACH signal parameters and report these back to the RAN 112 or the core network 110, which further reports them back to the network management system 140. An advantage of the RACH measurements is that they are distinguished from the signals emitted by, e.g., a primary user of a band, which allows them to be identified as interference to a primary user.

The wireless terminals 130 may even report RACH measurements on certain time instants and specific RACH resources, which can enable the RAN 112 and/or the network management system 140 to localize the source of any uplink interference to specific cells 120. This is because cells 120 are aware of when and with what waveform wireless terminals 130 used a RACH signal to obtain access into the system 100, which is information that can be supplied back to the network management system 140 for correlation with the network measurements 180 made by other wireless terminals 130.

In this context, wireless terminals 130 in an idle mode (i.e., not involved in an active voice or data session) may be utilized to assist in determination of uplink interference. Consider an idle wireless terminal 130 that is likely to be in the vicinity of a protected zone or forbidden area 212. The wireless terminal 130 may listen on a frequency that it normally transmits on, while idle. If idle wireless terminals 130 are made aware of the special RACH signaling waveforms employed in a network 100 associated with the idle wireless terminals 130, the idle wireless terminals 130 can measure and report back RACH interference levels. The wireless terminals 130 may report the measured interference levels to the radio access network 112, which further reports it back to the core network 110, which reports it to the network management system 140.

The wireless terminals 130 may report RACH measurements 180 on certain time instants and specific RACH resources, which can enable the radio access network 112 and the network management system 140 to localize the source of the uplink interference to specific base stations 120. The base stations 120 may be aware of when and with what waveform wireless terminals 130 used a RACH signal to obtain access into the wireless network 100, which is information that can be supplied back to the network management system 140 for correlation with the measurements 180 made by idle wireless terminals 130.

Figure 3:
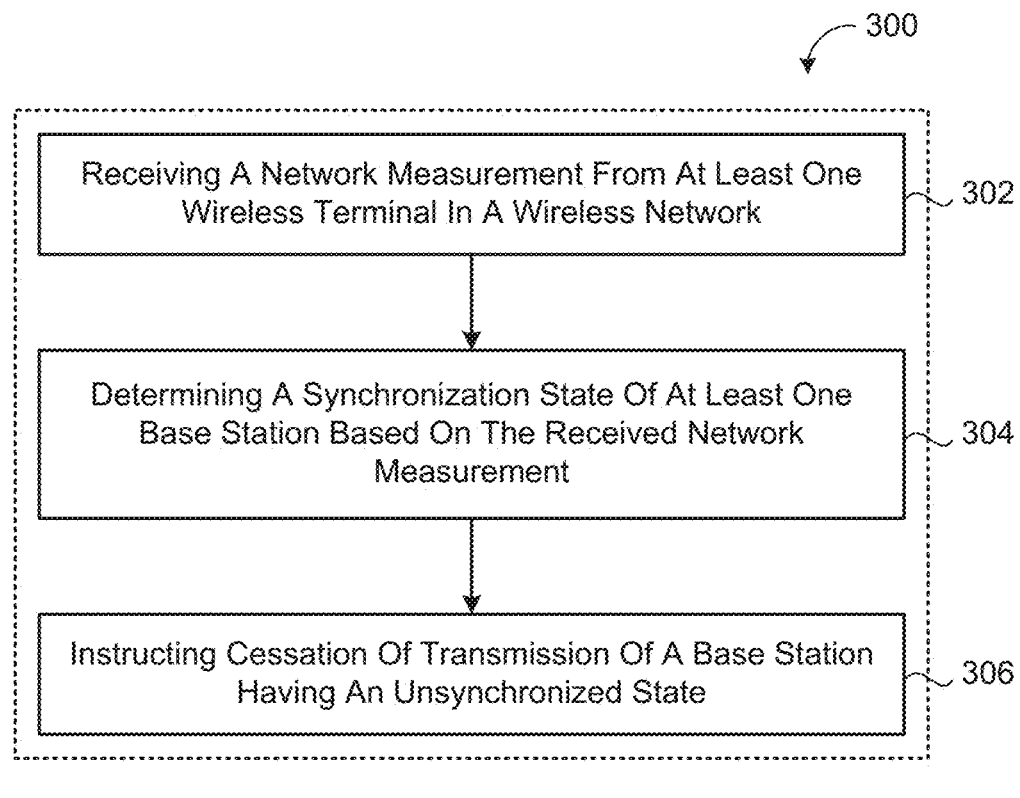
FIG. 3 is an exemplary arrangement of operations for a method of determining synchronization compliance in a wireless network.
Figure 3:
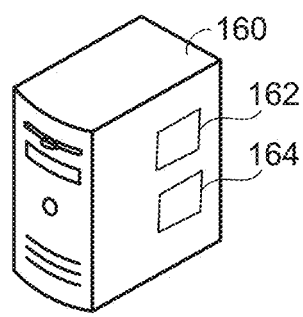

FIG. 3 provides an exemplary arrangement of operations for a method 300 of determining synchronization compliance in a wireless network 100. The method includes receiving 302, at a computing processor 162, a network measurement 180 from at least one wireless terminal 130 in the wireless network 100. The network measurement 180 is made with respect to at least one base station 120 in the wireless network 100. The method also includes determining 304, at the computing processor 162, a synchronization state of at least one base station 120 based on the received network measurement 180.

In some implementations, the method 300 includes instructing the wireless terminal(s) 130 to take network measurements 180 at certain time intervals and providing the wireless terminal(s) 130 a time reference 152, such as from the synchronization clock 152. The method may include instructing 306 cessation of transmission of a base station 120 having an unsynchronized state, as this may cause damage to the network 100.

The network measurement 180 may include a timing offset measurement between a first base station 120a and a second base station 120b. In some implementations, the network measurement 180 is a reference signal time difference (RSTD) between the first and second base stations 120a, 120b. The method may include determining that the first and second base stations 120a, 120b are in an unsynchronized state when the reference signal time difference between the first and second base stations 120a, 120b is greater than a threshold time difference. The method may also include identifying a deviant base station 120 (e.g., one of the first and second base stations 120a, 120b) having an unsynchronized state based on multiple network measurements 180 received with respect to the deviant base station 120 (e.g., multiple measurements 180 with neighboring base stations 120a and instructing cessation of transmission of the deviant base station 120. In some examples, the network measurements 180 are reference signal time differences with respect to multiple different base stations 120 and the deviant base station 120. The method may include receiving a threshold number of network measurements 180 before identifying the deviant base station 120.

In some implementations, the method includes identifying a set of wireless terminals 130 associated with a base station 120 and instructing the set of wireless terminals 130 or a subset of the wireless terminals 130 associated with the base station 120 to return network measurements 180. Moreover, the method may include instructing different subsets of wireless terminals 130 associated with the base station 120 over time to return network measurements 180 and/or instructing random subsets of wireless terminals 130 associated with the base station 120 over time to return network measurements 180.

The method may include instructing the wireless terminal(s) 130 to take network measurements 180 on a communication band at any time the wireless terminal(s) 130 is not transmitting on that band or on a communication band during uplink time slots. Additionally or alternatively, the method may include instructing the wireless terminal(s) 130 to take network measurements 180 on a communication band upon realizing a trigger condition, such as a loss of communications with the wireless network 100. In such cases, the method may include instructing the wireless terminal(s) 130 to store the network measurements 180 in non-transitory memory 136 during loss of communications with the wireless network 100 and report the stored network measurements 180 (e.g., to the core network 110, which forwards them to the network management system 140 and onward to the synchronization controller 150) after regaining communications with wireless network 100.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of synchronization validation in a wireless network, the method comprising:
    receiving, at a computing processor, terminal information from a first base station in the wireless network for a set of wireless terminals associated with the first base station;
    identifying, by the computing processor, the set of wireless terminals associated with the first base station based on the terminal information;
    instructing, by the computing processor, the set of wireless terminals or a subset of the wireless terminals associated with the first base station to return network measurements;
    instructing, by the computing processor, at least one wireless terminal from the set of wireless terminals or the subset of wireless terminals to take network measurements on a random access channel during uplink time slots, wherein the random access channel is configured to allow access to the wireless network by the at least one wireless terminal and is associated with a forbidden area where transmission is forbidden, the at least one wireless terminal including a transmitter and a receiver, wherein the transmitter is configured to be inactive in the forbidden area and the receiver is configured to be active in the forbidden area;
    receiving, at the computing processor, a network measurement from at least one of the wireless terminals in the wireless network instructed by the computing processor to return network measurements, the network measurement made with respect to at least the first base station; and
    determining, at the computing processor, a synchronization state of at least one base station based on the received network measurements.

2. The method of claim 1, further comprising:
    instructing the at least one wireless terminal to take network measurements at certain time intervals; and
    providing the at least one wireless terminal a time reference.

3. The method of claim 1, further comprising instructing cessation of transmission of the first base station or another base station in the wireless network having a synchronization state of unsynchronized.

4. The method of claim 1, wherein the network measurement comprises a timing offset measurement between the first base station and a second base station.

5. The method of claim 4, wherein the network measurement comprises a reference signal time difference $\Delta T$ between the first and second base stations, wherein $$\Delta T = T_{SubframeRxj} - T_{SubframeRxi}; \text{ and}$$

wherein $T_{SubframeRxj}$ is a time when a wireless terminal receives a start of one subframe from the second base station, $T_{SubframeRxi}$ is a time when the wireless terminal receives a corresponding start of one subframe from the first base station that is closest in time to the one subframe received from the second base station.

6. The method of claim 5, further comprising determining that the first and second base stations are in an unsynchronized state when the reference signal time difference $\Delta T$ between the first and second base stations is greater than a threshold time difference.

7. The method of claim 6, further comprising:
    identifying a deviant base station having an unsynchronized state based on multiple network measurements received with respect to the deviant base station; and
    instructing cessation of transmission of the deviant base station.

8. The method of claim 7, wherein the network measurements comprise reference signal time differences with respect to multiple different base stations and the deviant base station.

9. The method of claim 7, further comprising receiving a threshold number of network measurements before identifying the deviant base station.

10. The method of claim 1, further comprising instructing different subsets of wireless terminals associated with the first base station over time to return network measurements.

11. The method of claim 1, further comprising instructing random subsets of wireless terminals associated with the first base station over time to return network measurements.

12. The method of claim 1, further comprising instructing the at least one wireless terminal to take network measurements on a communication band at any time the at least one wireless terminal is not transmitting on that band.

13. The method of claim 1, further comprising instructing the at least one wireless terminal to take network measurements on a communication band upon realizing a trigger condition.

14. The method of claim 13, wherein the trigger condition comprises loss of communications with the wireless network.

15. The method of claim 14, further comprising instructing the at least one wireless terminal to:
    store the network measurements in non-transitory memory during loss of communications with the wireless network; and
    report the stored network measurements after regaining communications with wireless network.

16. A synchronization controller for a wireless network having base stations in wireless communication with at least one wireless terminal, the synchronization controller comprising:
    a computing processor executing a set of instructions that configure the computing processor to:
    receive terminal information from a first base station in the wireless network for a set of wireless terminals associated with the first base station;
    identify the set of wireless terminals associated with the first base station based on the terminal information;
    instruct the set of wireless terminals or a subset of the wireless terminals associated with the first base station to return network measurements;
    instruct at least one wireless terminal from the set of wireless terminals or the subset of wireless terminals to take network measurements on a random access channel during uplink time slots, wherein the random access channel is configured to allow access to the wireless network by the at least one wireless terminal and is associated with a forbidden area where transmission is forbidden, the at least one wireless terminal including a transmitter and a receiver, wherein the transmitter is configured to be inactive in the forbidden area and the receiver is configured to be active in the forbidden area;
    receive a network measurement made with respect to at least the first base station from at least one of the wireless terminals in the wireless network instructed by the computing processor to return network measurements; and determine a synchronization state of at least one base station based on the received network measurement.

17. The synchronization controller of claim 16, wherein the computing processor is configured to:

instruct the at least one wireless terminal to take network measurements at certain time intervals; and provide the at least one wireless terminal a time reference.

18. The synchronization controller of claim 16, wherein the computing processor is configured to instruct cessation of transmission of the first base station or another base station in the wireless network having a synchronization state of unsynchronized.

19. The synchronization controller of claim 16, wherein the network measurement comprises a timing offset measurement between the first base station and a second base station.

20. The synchronization controller of claim 19, wherein the network measurement comprises a reference signal time difference $\Delta T$ between the first and second base stations, wherein $$\Delta T = T_{SubframeRxj} - T_{SubframeRxi};$$ and wherein $T_{SubframeRxj}$ is a time when a wireless terminal receives a start of one subframe from the second base station, $T_{SubframeRxi}$ is a time when the wireless terminal receives a corresponding start of one subframe from the first base station that is closest in time to the one subframe received from the second base station.

21. The synchronization controller of claim 20, wherein the computing processor is configured to determine that the first and second base stations are in an unsynchronized state when the reference signal time difference $\Delta T$ between the first and second base stations is greater than a threshold time difference.

22. The synchronization controller of claim 21, wherein the computing processor is configured to:

identifying a deviant base station having an unsynchronized state based on multiple network measurements received with respect to the deviant base station; and instructing cessation of transmission of the deviant base station.

23. The synchronization controller of claim 22, wherein the network measurements comprise reference signal time differences with respect to multiple different base stations and the deviant base station.

24. The synchronization controller of claim 22, wherein the computing processor is configured to receive a threshold number of network measurements before identifying the deviant base station.

25. The synchronization controller of claim 16, wherein the computing processor is configured to instruct different subsets of wireless terminals associated with the first base station over time to return network measurements.

26. The synchronization controller of claim 16, wherein the computing processor is configured to instruct random subsets of wireless terminals associated with the first base station over time to return network measurements.

27. The synchronization controller of claim 16, wherein the computing processor is configured to instruct the at least one wireless terminal to take network measurements on a communication band at any time the at least one wireless terminal is not transmitting on that band.

28. The synchronization controller of claim 16, wherein the computing processor is configured to instruct the at least one wireless terminal to take network measurements on a communication band upon realizing a trigger condition.

29. The synchronization controller of claim 28, wherein the trigger condition comprises loss of communications with the wireless network.

30. The synchronization controller of claim 29, wherein the computing processor is configured to instruct the at least one wireless terminal to:

store the network measurements in non-transitory memory during loss of communications with the wireless network; and report the stored network measurements after regaining communications with wireless network.

* * * * *